United States Patent
Lu et al.

(10) Patent No.: US 12,074,386 B2
(45) Date of Patent: Aug. 27, 2024

(54) ANTENNA SYSTEM INTEGRATED WITH SIDE-KEYS OF AN ELECTRONIC DEVICE

(71) Applicant: Google LLC, Mountain View, CA (US)

(72) Inventors: Jeng-Hau Lu, Taoyuan (TW);
Yu-Chieh Lin, Taoyuan (TW);
Min-Sen Kuo, Taoyuan (TW);
Chia-Chi Huang, Taoyuan (TW);
Ying-Chih Wang, Taoyuan (TW)

(73) Assignee: Google LLC, Mountain View, CA (US)

( * ) Notice: Subject to any disclaimer, the term of this patent is extended or adjusted under 35 U.S.C. 154(b) by 57 days.

(21) Appl. No.: 17/934,011

(22) Filed: Sep. 21, 2022

(65) Prior Publication Data
US 2023/0140652 A1    May 4, 2023

Related U.S. Application Data

(63) Continuation of application No. PCT/US2021/057376, filed on Oct. 29, 2021.

(51) Int. Cl.
*H01Q 5/371*    (2015.01)
*H01Q 3/12*    (2006.01)
*H01Q 5/50*    (2015.01)

(52) U.S. Cl.
CPC .............. *H01Q 5/371* (2015.01); *H01Q 3/12* (2013.01); *H01Q 5/50* (2015.01)

(58) Field of Classification Search
CPC ............ H01Q 5/371; H01Q 3/12; H01Q 5/50; H01Q 1/243; H01Q 1/36; H01Q 1/52; H04M 1/236; H04M 1/026
See application file for complete search history.

(56) References Cited

U.S. PATENT DOCUMENTS

| | | | |
|---|---|---|---|
| 2012/0256807 A1* | 10/2012 | Ma | H01Q 1/48 343/860 |
| 2019/0312960 A1* | 10/2019 | Hwang | H01Q 1/243 |
| 2022/0069443 A1* | 3/2022 | Jeon | H01Q 1/243 |

FOREIGN PATENT DOCUMENTS

| | | |
|---|---|---|
| EP | 3550806 | 10/2019 |
| WO | 2020153694 | 7/2020 |

OTHER PUBLICATIONS

"International Search Report and Written Opinion", Application No. PCT/US2021/057376, Jul. 22, 2022, 13 pages.
"International Preliminary Report on Patentability", Application No. PCT/US2021/057376, Apr. 30, 2024, 9 pages.

\* cited by examiner

*Primary Examiner* — David E Lotter
(74) *Attorney, Agent, or Firm* — Colby Nipper PLLC

(57) ABSTRACT

This document describes methods and systems for an antenna system integrated with side-keys of an electronic device. The antenna system enables antenna integration in a metal frame using a metal support structure and fastener(s) to route antenna signals around side-key modules embedded in the frame without encountering or causing interference with the side-key modules. By using these techniques to integrate antennas on areas around the side-key modules, more antennas can be implemented on the electronic device, leading to improved capabilities supporting additional wireless standards and a better user experience in terms of improved communication quality.

20 Claims, 6 Drawing Sheets

ANTENNA SYSTEM INTEGRATED WITH SIDE-KEYS OF AN ELECTRONIC DEVICE

CROSS-REFERENCE TO RELATED APPLICATION(S)

This application is a continuation application of International Application Serial No. PCT/US2021/057376, filed Oct. 29, 2021, the disclosure of which is incorporated by reference herein in its entirety.

BACKGROUND

The continuously increasing communication standards require more antenna integration in mobile devices, increasing the demand for antenna design in other less-popular areas inside the device. Side-keys are modules with button or button-like components that are embedded in the frame of the device and can trigger some functions. For example, a power button can turn the device on or off, a volume button can increase or decrease the device's volume, a fingerprint sensor can detect a finger touch and record the detected finger's fingerprint, etc. Devices having a small form factor (e.g., smartphone) have limited areas to implement additional antennas, which increases the challenge of integrating antennas in the device without compromising functionality or performance of other components such as the side-key modules.

SUMMARY

This document describes methods and systems for an antenna system integrated with side-keys of an electronic device. The antenna system enables antenna integration in a metal frame using a metal support structure and fastener(s) to route antenna signals around side-key modules embedded in the frame without encountering or causing interference with the side-key modules. By using these techniques to integrate antennas on areas around the side-key modules, more antennas can be implemented on the electronic device, leading to improved capabilities supporting additional wireless standards and a better user experience in terms of improved communication quality.

In aspects, an electronic device includes a housing and a main logic board disposed within the housing. The main logic board has a signal generator configured to generate, through one or more antennas, one or more antenna signals. The electronic device also includes a metal frame disposed along at least one edge of the housing and configured to provide structural support for the housing. The metal frame includes one or more apertures that enable the metal frame to be configured as an antenna radiating element of the one or more antenna signals generated by the one or more antennas. The metal frame also includes an interior surface and an opposing, exterior surface. In addition, the electronic device includes a side-key module embedded in the metal frame. The electronic device also includes a metal support having an elongated shape and is oriented to be substantially parallel with the metal frame. The metal support has one or more contact surfaces that abut the interior surface of the metal frame on one or more opposing sides of the side-key module. At least a portion of the side-key module is positioned directly between the metal support and the metal frame. The metal support also has a rear surface that is opposite the one or more contact surfaces. Additionally, the electronic device includes an antenna spring and one or more metal fasteners. The antenna spring is in direct electrical contact with the metal support and the signal generator and is configured to inject the one or more antenna signals into the metal support. The one or more metal fasteners affix the metal support to the metal frame to provide a path for the one or more antenna signals to be routed from the metal support to the metal frame.

In some implementations, the side-key module is positioned between the antenna spring and the metal frame. In addition or as an alternative, in some of these implementations, the side-key module includes a user input mechanism configured to control one or more functions of the electronic device or an application executing on the electronic device. In addition or as an alternative, in some of these implementations, the side-key module includes a pressable button or a touch-sensitive control. In addition or as an alternative, in some of these implementations, the side-key module includes a volume button or a power button.

In some implementations, the electronic device further includes a flexible printed circuit wrapped around at least a portion of the metal support to connect the side-key module to the main logic board. In addition or as an alternative, in some of these implementations, the electronic device also includes a pressure sensitive adhesive connecting the flexible printed circuit to the metal support. In addition or as an alternative, in some of these implementations, the flexible printed circuit is routed along a first lengthwise portion of the interior surface of the metal frame, wrapped around one or more lateral sides of the metal support, and routed along a second lengthwise portion of the rear surface of the metal support.

In some implementations, the one or more fasteners are electrically conductive and transfer the one or more antenna signals from the metal support to the metal frame.

In some implementations, the one or more fasteners include at least two fasteners separated by the side-key module. In addition or as an alternative, in some of these implementations, the electronic device also includes one or more gaskets positioned between the metal support and the metal frame. In addition or as an alternative, in some of these implementations, the one or more gaskets include two gaskets each positioned on an opposing side of the side-key module from one another to reduce signal interference from the antenna signal to the side-key module. In addition or as an alternative, in some of these implementations, the two gaskets are located between two of the at least two fasteners.

In some implementations, the one or more fasteners include screws, bolts, rivets, or studs.

In some implementations, the electronic device also includes multiple antenna springs including the antenna spring. Each antenna spring is in direct electrical contact with the metal support and is configured to inject corresponding antenna signals into the metal support to route the corresponding antenna signals through the one or more metal fasteners and to the metal frame to induce radiation that generates the one or more antennas.

This summary is provided to introduce simplified concepts concerning an antenna system integrated with side-keys of an electronic device, which is further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of an antenna system integrated with side-keys of an electronic device are described in this document with reference to the following drawings. The same numbers are used throughout the drawings to reference like features and components:

FIG. 5-1 illustrates a sectional view of the portion of the electronic device in FIG. 5, taken along line A-A;

FIG. 5-2 illustrates a sectional view of the portion of the electronic device in FIG. 5, taken along line B-B.

The details of one or more aspects of an antenna system integrated with side-keys of an electronic device are described in this document with reference to the following drawings. The same numbers are used throughout the drawings to reference like features and components:

DETAILED DESCRIPTION

Overview

This document describes methods and systems for an antenna system integrated with side-keys of an electronic device. The antenna system described herein enables areas around the side-keys (e.g., buttons or button-like components) to be utilized as antennas without experiencing interference from the side-keys and without causing interference with the functionality of the side-keys. Antenna integration is implemented by using an electrically conductive (e.g., metallic) support structure and fastener (e.g., screw). For example, a metallic frame having one or more arms (e.g., antenna structures) is formed as one or more antennas based on, e.g., slits in appropriate locations on the frame. Injecting signals electrically into the frame and its arm(s) can induce electric currents flowing along the frame, which can induce radiation that generates an antenna. To accommodate side-keys, which are embedded in the frame, and avoid signal interference, the support structure helps route the injected signals around the side-keys and into the frame. Antenna springs are connected to the support structure and are configured to inject the antenna signals into the support structure. The support structure is affixed to the frame by the fastener, which helps transfer the signals from the support structure to the frame.

While features and concepts of the described methods and systems for an antenna system integrated with side-keys of an electronic device can be implemented in any number of different environments, aspects are described in the context of the following examples.

Example Device

Figure 1:
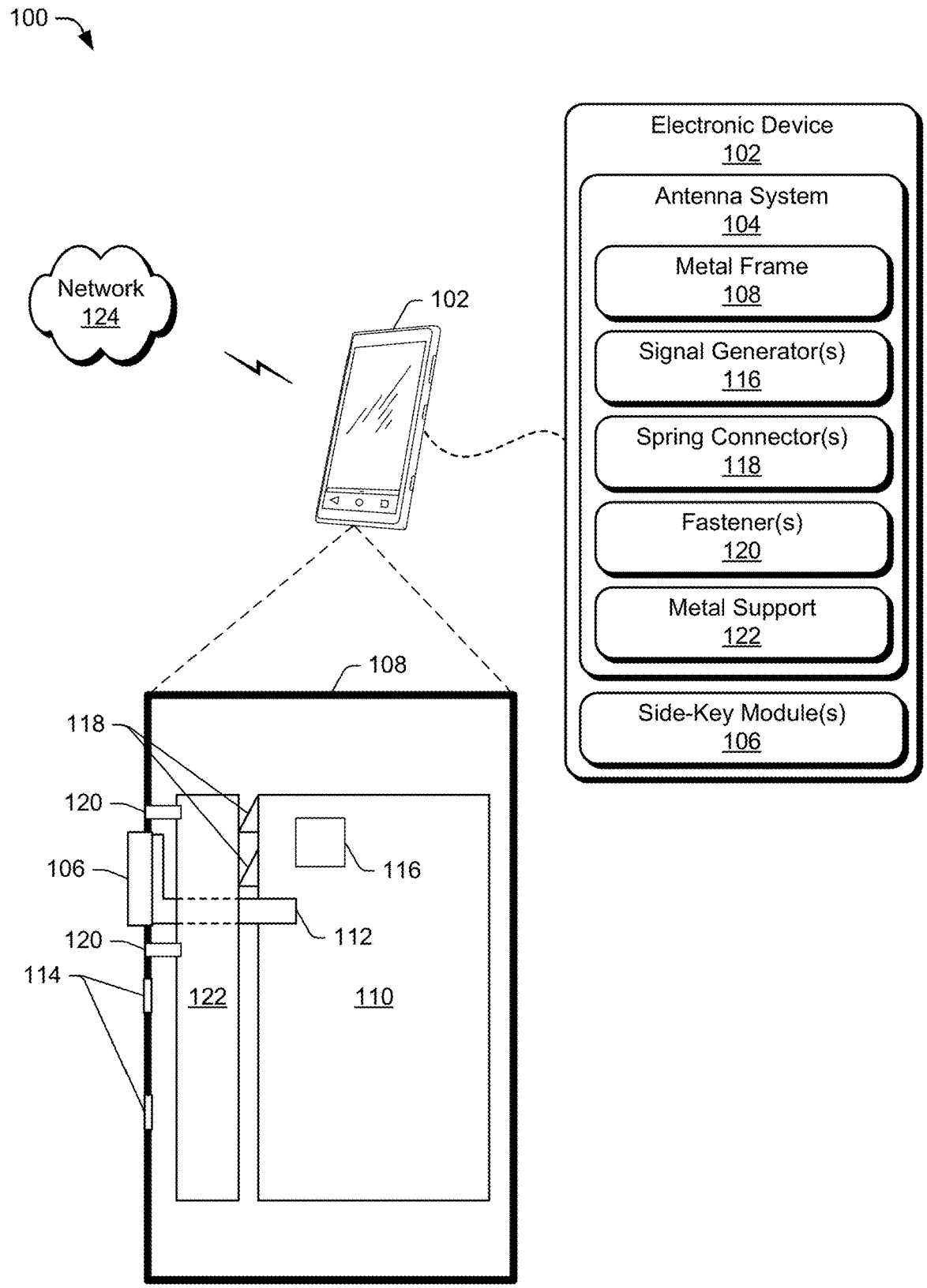
FIG. 1 illustrates an example implementation of an antenna structure integrated with side-keys of an electronic device in accordance with the techniques described herein.

FIG. 1 illustrates an example implementation 100 of an electronic device (e.g., electronic device 102) having an antenna system 104 integrated with one or more side-key module(s) 106. In an example, the side-key module 106 is embedded in a frame (e.g., metal frame 108) of the electronic device 102 and connected to a main logic board (MLB) 110 by a flexible printed circuit (FPC) 112. The metal frame 108 may include one or more apertures 114 (e.g., slots, slits, holes, cutouts) that enable the metal frame 108 to act as a radiating element for one or more antennas.

To provide a direct electrical path for antenna signals generated by one or more signal generators 116 on the MLB 110 to the metal frame 108, the antenna system 104 includes one or more antenna springs 118, one or more electrically conductive fasteners (e.g., fasteners 120), and a conductive support structure (e.g., metal support 122). Although the signal generator 116 and the antenna spring 118 are illustrated as separate components, this is not intended to be limiting. Rather, in an aspect, the signal generator 116 and the antenna spring 118 may comprise a single entity or part having the characteristics of both the signal generator 116 and the antenna spring 118 as well as being configured to perform functionalities of the both of the signal generator 116 and the antenna spring 118. Using the various components of the antenna system 104 described herein, antenna signals can be routed around the side-key module 106 and injected into the metal frame 108 sufficient to cause the metal frame 108 to act as a radiating element for one or more antennas without causing signal interference to the side-key module 106.

Further, the antenna system 104 enables the electronic device 102 to communicate wirelessly with other devices and/or servers over a network (e.g., network 124). The network 124 may be any suitable network, some examples of which include a local-area-network (LAN), a wireless local-area-network (WLAN), a personal-area-network (PAN), a wide-area-network (WAN), an intranet, the Internet, a peer-to-peer network, point-to-point network, or a mesh network.

Figure 2:
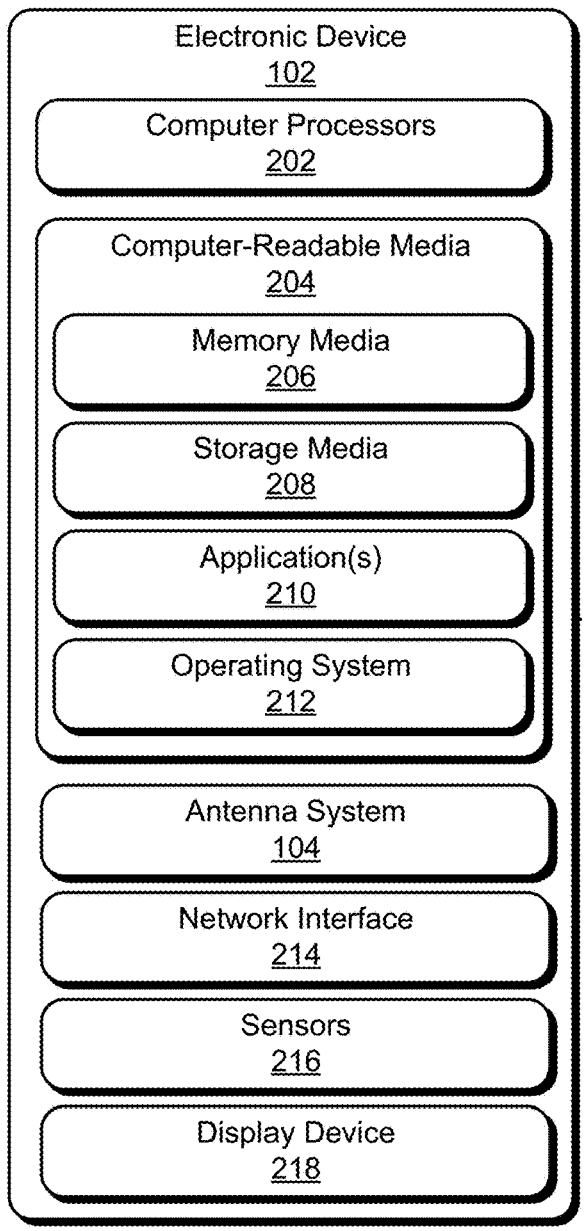
FIG. 2 illustrates an example implementation of the electronic device from FIG. 1 in more detail.
Figure 2:
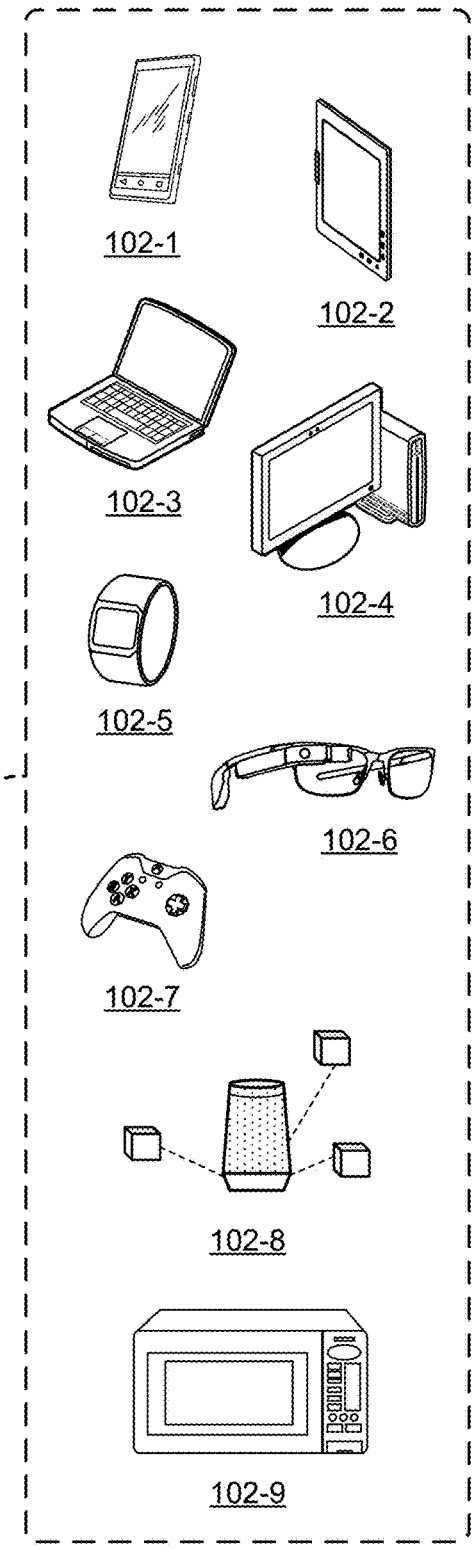

In more detail, consider FIG. 2, which illustrates an example implementation 200 of the electronic device 102 from FIG. 1. The electronic device 102 of FIG. 2 is illustrated with a variety of example devices, including a smartphone 102-1, a tablet 102-2, a laptop 102-3, a desktop computer 102-4, a wearable electronic device (e.g., a computing watch 102-5, computing spectacles 102-6), a gaming system 102-7, a home-automation and control system 102-8, and a microwave 102-9. The electronic device 102 can also include other devices, e.g., televisions, entertainment systems, audio systems, automobiles, drones, track pads, drawing pads, netbooks, e-readers, home security systems, and other home appliances. Note that the electronic device 102 can be mobile, wearable, non-wearable but mobile, or relatively immobile (e.g., desktops and appliances).

The electronic device 102 also includes one or more computer processors 202 and one or more computer-readable media 204. The one or more computer-readable media 204 includes memory media 206 and storage media 208. Applications 210 and/or an operating system 212 implemented as computer-readable instructions on the computer-readable media 204 can be executed by the computer processors 202 to provide some or all of the functionalities described herein.

Various implementations of the antenna system 104 can include, or communicate with, a System-on-Chip (SoC), one or more Integrated Circuits (ICs), a processor with embedded processor instructions or configured to access processor instructions stored in memory, hardware with embedded firmware, a printed circuit board with various hardware components, or any combination thereof.

The electronic device 102 may also include a network interface 214. The electronic device 102 can use the network interface 214 for communicating data over wired, wireless, or optical networks (e.g., the network 124). By way of example and not limitation, the network interface 214 may communicate data over a local-area-network (LAN), a wireless local-area-network (WLAN), a personal-area-network (PAN), a wide-area-network (WAN), an intranet, the Internet, a peer-to-peer network, point-to-point network, or a mesh network.

The electronic device 102 also includes one or more sensors 216, which can include any of a variety of sensors, including an audio sensor (e.g., a microphone), a touch-input sensor (e.g., a touchscreen, a fingerprint sensor, a capacitive touch sensor), an image-capture device (e.g., a camera or video-camera), proximity sensors (e.g., capacitive sensors), or an ambient light sensor (e.g., photodetector). In aspects, the sensor 216 may include, or be integrated with, the side-key module 106 in FIG. 1. For example, the side-key module 106 may be a fingerprint sensor to detect and scan a fingerprint of a user's finger, e.g., for authentication to the electronic device 102. In another example, the side-key module 106 may include a capacitive touch sensor configured to detect touch input by the user to trigger a function of an application (e.g., the application 210) running on the electronic device 102, such as to increase or decrease the volume, skip to a next music track, repeat a previous music track, trigger a capture of a screen shot, trigger image capture by a camera, etc.

The electronic device 102 can also include a display device (e.g., display device 218). The display device 218 can include any suitable touch-sensitive display device, e.g., a touchscreen, a liquid crystal display (LCD), thin film transistor (TFT) LCD, an in-plane switching (IPS) LCD, a capacitive touchscreen display, an organic light-emitting diode (OLED) display, an active-matrix organic light-emitting diode (AMOLED) display, super AMOLED display, and so forth. The display device 218 may be referred to as a display or a screen, such that digital content may be displayed on-screen.

These and other capabilities and configurations, as well as ways in which entities of FIGS. 1 and 2 act and interact, are set forth in greater detail below. These entities may be further divided, combined, and so on. The implementation 100 of FIG. 1 and the detailed illustrations of FIG. 2 through FIG. 6 illustrate some of many possible environments, devices, and methods capable of employing the described techniques, whether individually or in combination with one another.

Figure 3:
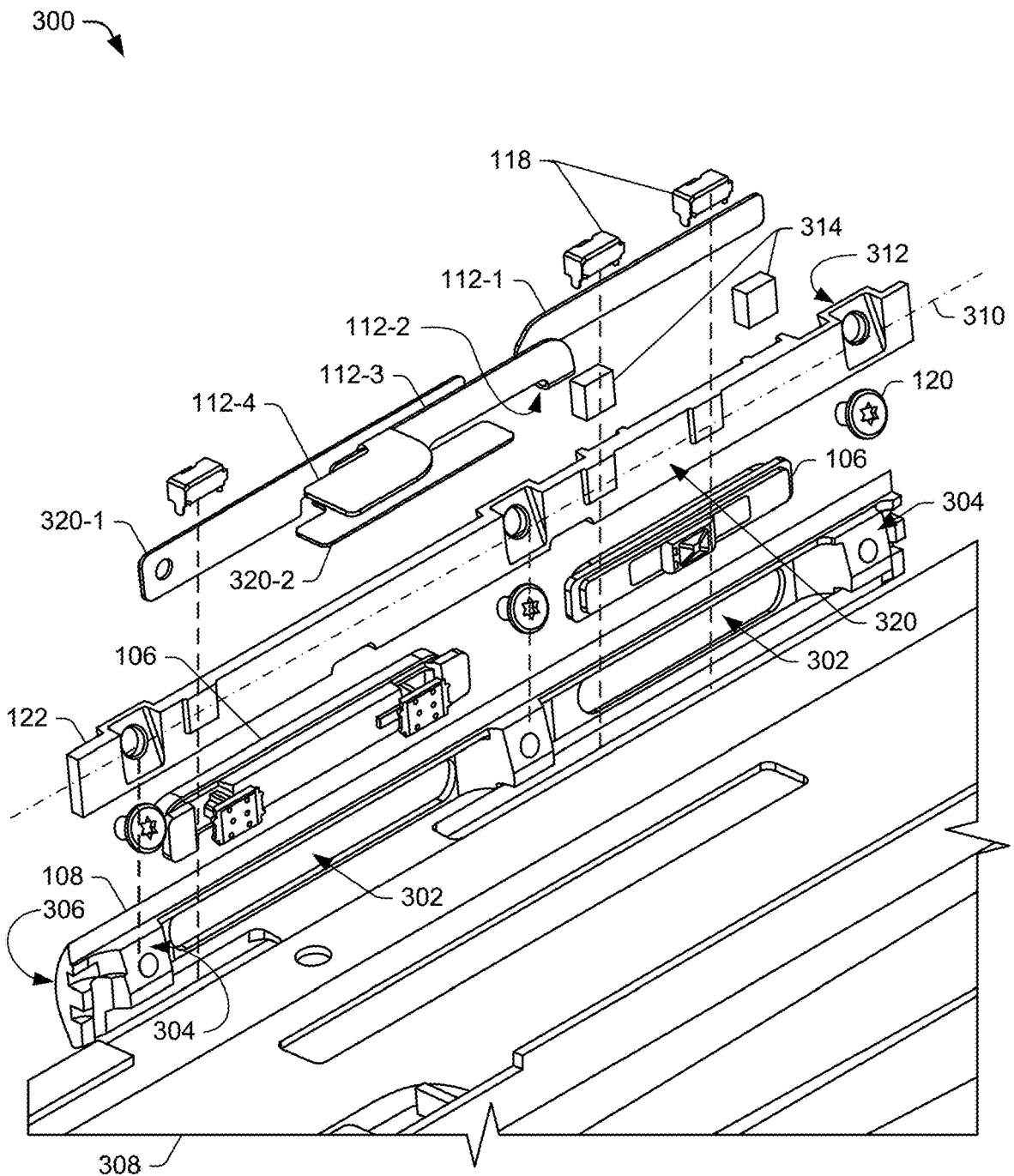
FIG. 3 illustrates an exploded view of a portion of the electronic device from FIG. 1, including the antenna structure integrated with the side-keys of the electronic device.

FIG. 3 illustrates an exploded view 300 of a portion of the electronic device from FIG. 1, including the antenna system 104 integrated with the side-keys of the electronic device 102. In the illustrated example, a portion of the metal frame 108 of the electronic device 102 is disposed along an edge of the electronic device 102. The edge may be any suitable edge of the electronic device 102 including, for example, an edge that borders a display screen (e.g., the display device 218 in FIG. 2) of the electronic device 102.

The metal frame 108 defines one or more slots 302 used to embed the side-key modules 106 (e.g., a first side-key module 106-1, a second side-key module 106-2) into the metal frame 108. The metal frame 108 has an interior surface 304 and an exterior surface 306 that is opposite the interior surface 304. The metal frame 108 may be disposed along at least one edge of a housing 308 of the electronic device 102 and provides structural support for the electronic device 102. In implementations, the exterior surface 306 of the metal frame 108 may form part of an exterior surface of a housing of the electronic device 102. In another example, the metal frame 108 may be housed within the housing 308 of the electronic device 102 such that the exterior surface 306 of the metal frame 108 is located inside the housing 308. The metal frame 108 acts as a grounded metallic radiator with a length enabling its resonant mode to be aligned with the signal frequency and result in one or more antennas.

The metal support 122 is aligned with the metal frame 108 and affixed to the metal frame 108 via one or more of the fasteners 120. The metal support 122 includes a longitudinal axis 310, which is aligned (e.g., substantially parallel) with the metal frame 108 along the edge of the housing 308 of the electronic device 102. In the illustrated example, the metal support 122 includes one or more contact surfaces 312, which are configured to abut the interior surface 304 of the metal frame 108. The contact surfaces 312 of the metal support 122 surround a hole through which a fastener 120 (e.g., screw, bolt, stud, rivet) is inserted and fastened to the metal frame 108 to provide a clamping force and solidify the connection between the metal support 122 and the metal frame 108. This connection also provides a direct electrical path from the metal support 122 to the metal frame 108 via the fastener 120 and in some implementations, via the contact surface 312 of the metal support 122 to the interior surface 304 of the metal frame 108.

In another example, the metal support 122 and the metal frame 108 may be a single part, rather than separate components that are fixed together. For instance, the metal support 122 may be formed by creating one or more slots in a relatively thick metal frame 108. Such a slot can be used to make space for the side-key module 106 and the routing FPCs 112. In such an implementation, the metal frame 108 and the metal support 122 are connected without using the fasteners 120, and the metal support 122 is part of the metal frame 108.

In addition, one or more gaskets 314 may be disposed between the metal support 122 and the metal frame 108 to seal a gap between the metal support 122 and the metal frame 108 on opposing sides of the side-key module 106. In an example, the gaskets 314 are located proximate to opposing lengthwise ends of the side-key module 106 such that the side-key module 106 is oriented to be elongated in a direction that intersects the gaskets 314. In addition, the gaskets 314 help improve electrical conductivity between the metal support 122 and the metal frame 108 by reducing resistance for the current flowing along the metal support 122 to the metal frame 108. The gaskets 314 may further reduce signal interference between the side-key module 106 and the antenna signals traveling to the metal frame 108 to form antennas.

The one or more gaskets 314 may also be used to prevent antenna ohmic loses that are caused by floating metal parts introduced around the antenna. For example, the FPC 112 includes metallic ground traces that are connected to the side-key module 106 but which are not electrically connected to the metal frame 108 or the metal support 122. In this way, the metal ground traces are floating metal parts. One or more gaskets 314 can connect the ground traces of the FPC 112 and cause the FPC 112 and the metal support 122 to act electrically as a single conductive body.

In aspects, the metal support 122 may include one or more recessed areas 316 configured to receive a portion of an FPC wrapping around at least a portion of the metal support 122. For example, the FPC 112 includes a first portion 112-1 connected to a second portion 112-2, which is connected to a third portion 112-3. As illustrated, the first portion 112-1 may be positioned between the metal frame 108 and the metal support 122 such that the first portion 112 1 of the FPC 112 connects to the first side-key module 106-1. The second portion 112-2 wraps around the metal support 122 (e.g., radially around the longitudinal axis 310 of the metal support 122) and connects to the third portion 112 3, which is located on an opposing side (e.g., rear surface 318) of the metal support 122 from the first portion 112-1 of the FPC 112 (e.g., the side of the metal support 122 proximate to the MLB 110). The rear surface 318 of the metal support 122 is opposite the contact surfaces 312 of the metal support 122. The third portion 112 3 of the FPC 112 may be connected to a fourth portion 112-4, which is connected to the MLB 110. In some implementations, the FPC 112 may be attached to the metal support 122 via adhesive (e.g., pressure sensitive adhesive (PSA), glue).

One or more additional FPCs (e.g., FPC 320) may also wrap around the metal support 122, providing a direct electrical connection from the MLB 110 to another side-key module 106 (e.g., the second side-key module 106-2). For example, the FPC 320 includes a first section 320-1 connected to a second section 320-2, which bends around the metal support 122 and is connected to the MLB 110. As the FPC 320 bends around the metal support 122, the FPC 320 may be routed through one of the recessed areas 316 of the metal support 122 to reduce the length of the FPC 320 between the MLB 110 and the second side-key module 106-2.

Figure 4:
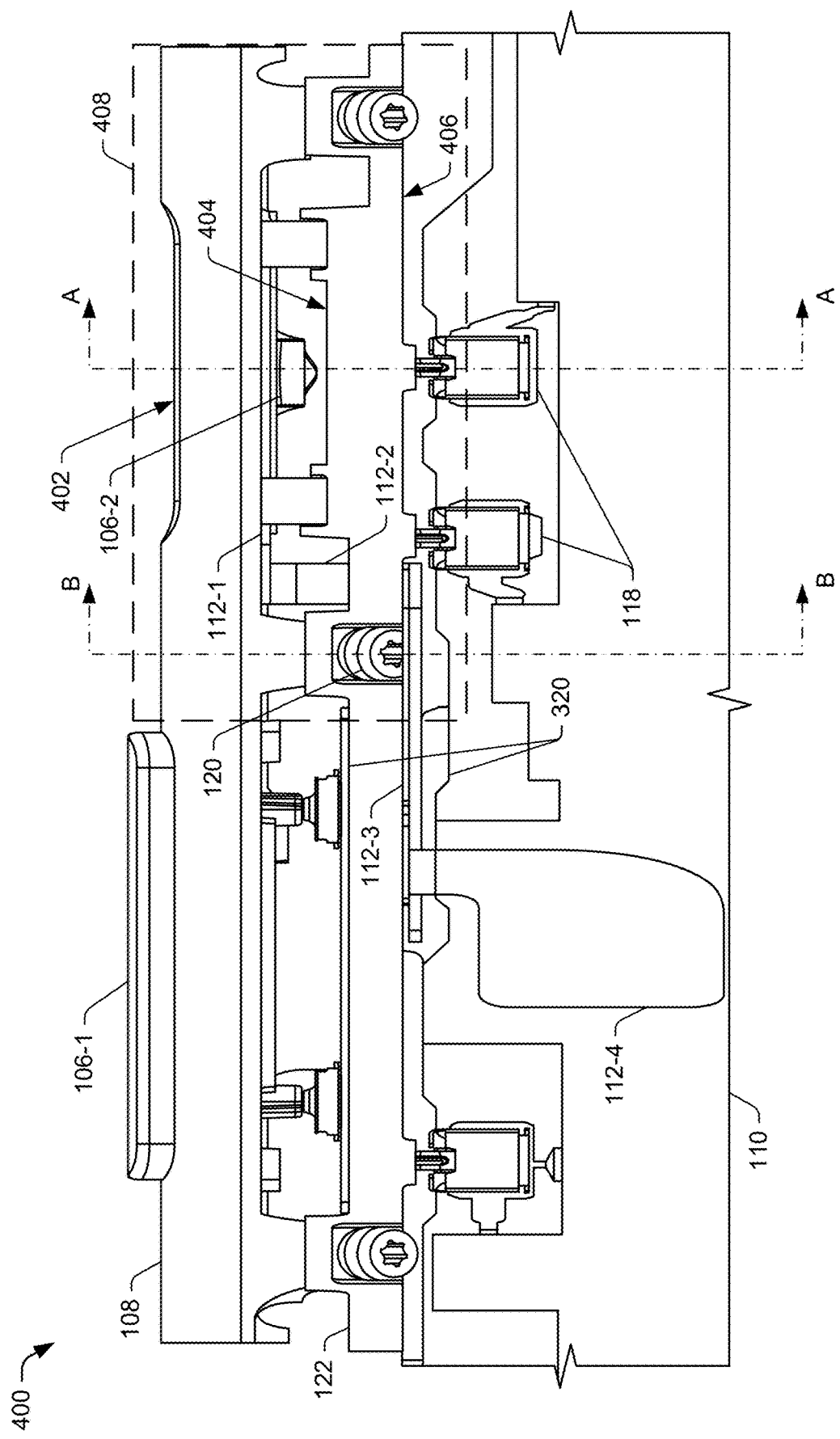
FIG. 4 illustrates a front view of the portion of the electronic device from FIG. 3 in an assembled state.

FIG. 4 illustrates a front view 400 of the portion of the electronic device from FIG. 3 in an assembled state. As illustrated, the metal support 122 and the metal frame 108 are assembled together by three fasteners 120, providing electrical paths on opposing sides of the side-key modules 106. Further, one or more of the antenna springs 118 are located directly behind the side-key modules 106 (e.g., the first side-key module 106-1, the second side-key module 106-2), which prevents a linear connection to the metal frame 108. In some implementations, the side-key module 106 may be a pressable button (e.g., the first side-key module 106-1), which may be embedded in the metal frame 108 and extend outwardly from the exterior surface 306 of the metal frame 108. In other implementations, the side-key module 106 may be a touch-sensitive button (e.g., the second side-key module 106-2), which may be embedded in the metal frame 108 and aligned with a recessed area 402 defined by the metal frame 108. The recessed area 402 may provide a tactile indication to a user of where the touch-sensitive button is located. As mentioned, the metal frame 108 provides a path for antenna signals, generated by the MLB 110 and injected into the metal support 122 by the antenna spring 118, to travel around the side-key module 106 without interfering with the functionality of the side-key module 106.

As illustrated, the FPC 112 wraps around a portion of the metal support 122. For example, the first portion 112-1 of the FPC 112 is disposed on the interior surface 304 of the metal frame 108, which is proximate to a first side 404 (e.g., frame-side) of the metal support 122, and connects to one of the side-key modules 106. The second portion 112-2 of the FPC 112 passes underneath (in the front view 400) the metal support and the third portion 112-3 of the FPC 112 is disposed proximate to a second side 406 (MLB-side) of the metal support 122. In the illustrated example, the third portion 112-3 is disposed on the second side 406 of the metal support 122, which corresponds to the rear surface 318 of the metal support 122. The fourth portion 112-4 of the FPC 112 connects directly to the MLB 110. The additional FPC 320 may be similarly oriented. For example, a portion of the FPC 320 is disposed on the first side 404 of the metal support 122 and connects to one of the side-key modules 106. The FPC 320 wraps underneath (in the front view 400) the metal support 122 and onto the second side 406 of the metal support 122 to connect directly to the MLB 110. In another example, the FPC 320 and/or the FPC 112 wrap over the top (in the front view 400) of the metal support 122, rather than underneath the metal support 122.

Figure 6:
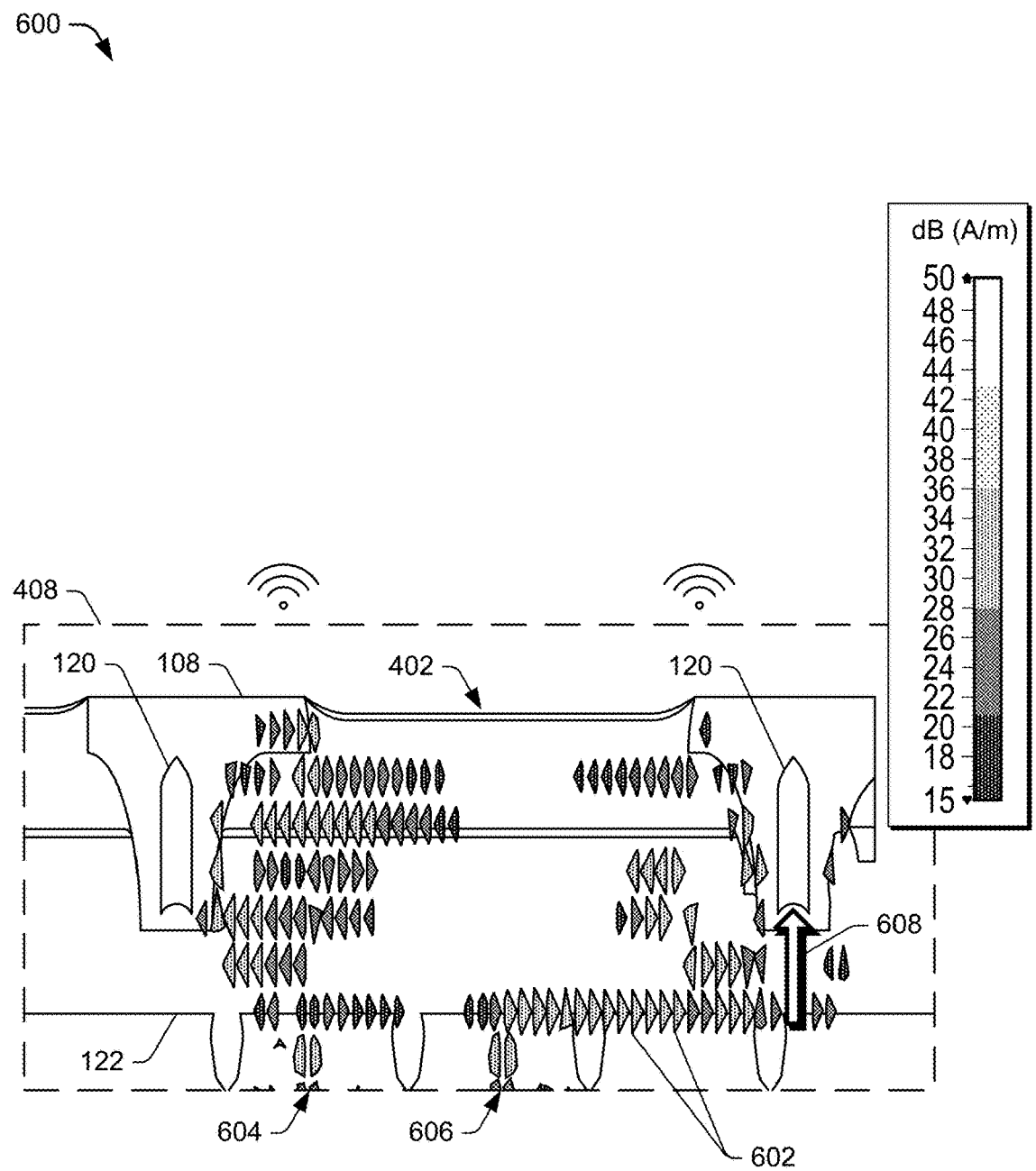
FIG. 6 illustrates a simplified front view of antenna-signal paths through the antenna structure from FIG. 1.

In this arrangement, the FPCs 112 and 320 provide direct electrical connections from the MLB 110 to the side-key modules 106. Further, the antenna springs 118, the metal support 122, the fasteners 120, and the metal frame 108 provide a direct electrical path for antenna signals from the MLB 110 to the metal frame 108 to enable the metal frame 108 to act as a resonating antenna element without interfering with the functionality of the side-key modules 106. A portion 408 of the front view 400 is shown in FIG. 6 in a simplified form to illustrate the path of the antenna signals generated by the antenna signal generator 116.

Although the illustrated example includes three fasteners 120 and three antenna springs 118 used to realize three antennas by the metal frame 108, any suitable number of fasteners and antenna springs can be used. Aspects including the length of the metal frame 108, a grounding location, the number of fasteners, antenna springs, and realized antennas are not limiting factors to the subject matter described herein. These aspects can be modified in any suitable manner. For example, if additional antennas with different frequency specifications are to be incorporated into the electronic device, the techniques described herein can be applied to enable the additional antennas.

Each antenna spring 118 may use a different fastener 120 than the other antenna springs 118 to connect the corresponding antenna signals to the metal frame 108. However, the number of fasteners is not limited by the number of antenna springs 118. Additional fasteners may be implemented to establish additional connection between the metal frame 108 and the metal support 122. Alternatively, fewer than three fasteners may be implemented. The number of fasteners used may depend on the architecture of the electronic device 102, including available space in the electronic device 102, number of side-key modules embedded in the metal frame 108, number of antennas to realize via the metal frame 108, and so forth.

Figures 1, 5:
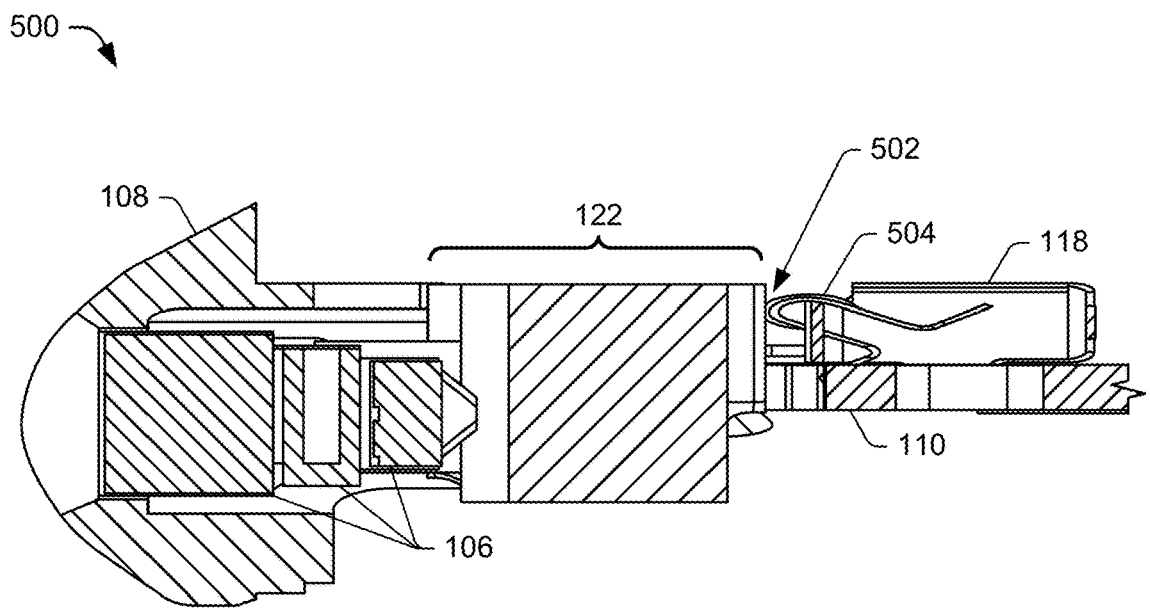
Figures 2, 5:
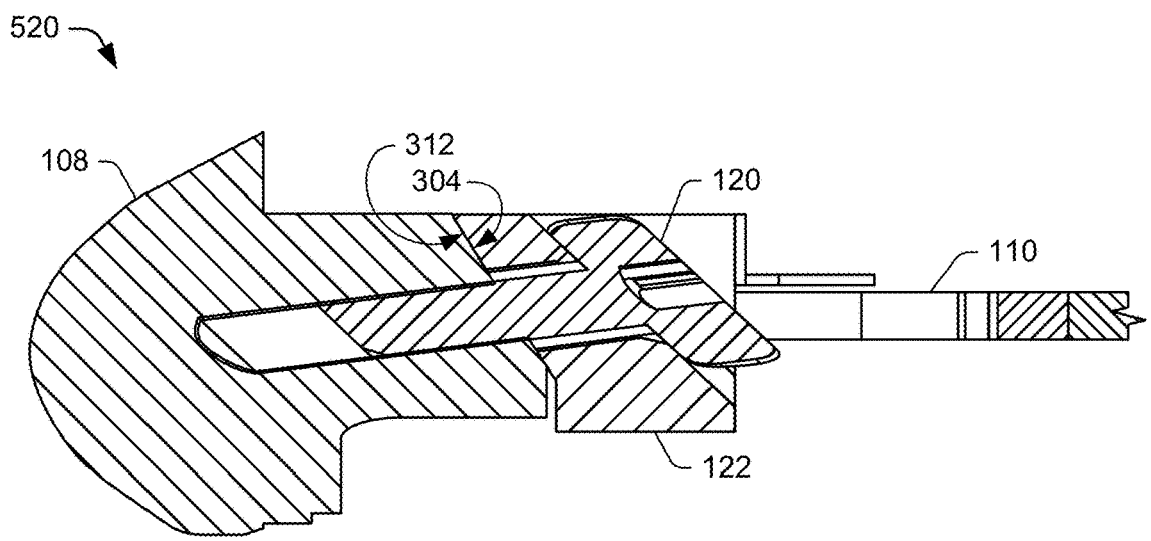

FIG. 5-1 illustrates a sectional view 500 of the portion of the electronic device 102 in FIG. 5, taken along line A—A. The sectional view 500 illustrates a point of contact 502 between a spring connector 504 of the antenna spring 118 and the metal support 122. The sectional view 500 also illustrates the side-key module 106, which is located directly between the antenna spring 118 and the metal frame 108. Further, the antenna spring 118 is mounted on the MLB 110. Although an antenna spring is used in the illustrated example, any suitable electrical connector may be used to provide direct electrical contact to the metal support 122 for injecting the antenna signal.

FIG. 5-2 illustrates a sectional view 520 of the portion of the electronic device 102 in FIG. 5, taken along line B—B. The sectional view 520 illustrates the fastener 120 securing, based on a clamping force, the metal support 122 to the metal frame 108 to solidify the connection between the metal frame 108 and the metal support 122 and enable passage of the antenna signal. The antenna signal may travel through the fastener 120 as well as through areas of the metal support 122 that contact the metal frame 108, including the contact surface 312 of the metal support 122 that abuts the interior surface 304 of the metal frame 108. Accordingly, the fastener 120 is an integral part of the antenna system 104 because the fastener 120 helps transfer the antenna signal from the metal support 122 to the metal frame 108.

FIG. 6 illustrates a simplified view 600 of a portion of the front view 400 from FIG. 4, showing example current flow in the antenna system. The direction arrows 602 in the diagram indicate the direction of electric current flowing through the antenna system 104 at approximately 2.44 GHz. The density of the illustrated pattern filling in the arrows 602 indicates an amount of the current flowing at that location. In the illustrated example, antenna signals, in the form of electric current, are injected into the metal frame 108 at location 604 and location 606 via the antenna springs 118 (shown in FIG. 4).

As illustrated, the current (e.g., the arrows 602) flows from the injection sites (e.g., locations 604 and 606) left and right through the metal support 122. The current then flows through the fasteners 120 (e.g., shown at arrow 608) and the surrounding surfaces of the metal support 122 and the metal frame 108 that are contacting one another. Then, the current flows into the metal frame 108. Due to the geometry of the metal frame (e.g., slots, cutouts, etc. in the metal frame 108), the metal frame 108 can act as the resonating antenna element for one or more antennas. Accordingly, the current flows around the side-key module 106, which is embedded in the metal frame 108, without interfering with the side-key module 106 functionality.

Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, including, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Some examples are described below:

An electronic device may comprise: a housing; a main logic board disposed within the housing, the main logic board having a signal generator configured to generate, through one or more antennas, one or more antenna signals; a metal frame disposed along at least one edge of the housing and configured to provide structural support for the housing, the metal frame having: one or more apertures that enable the metal frame to be configured as an antenna radiating element of the one or more antenna signals generated by the one or more antennas; and an interior surface and an opposing, exterior surface; a side-key module embedded in the metal frame; a metal support having an elongated shape and oriented to be substantially parallel with the metal frame, the metal support having one or more contact surfaces that abut the interior surface of the metal frame on one or more opposing sides of the side-key module, at least a portion of the side-key module positioned directly between the metal support and the metal frame, the metal support having a rear surface that is opposite the one or more contact surfaces; an antenna spring in direct electrical contact with the metal support and the signal generator, the antenna spring configured to inject the one or more antenna signals into the metal support; and one or more metal fasteners affixing the metal support to the metal frame to provide a path for the one or more antenna signals to be routed from the metal support to the metal frame.

The side-key module may be positioned between the antenna spring and the metal frame.

The side-key module may include a user input mechanism configured to control one or more functions of the electronic device or an application executing on the electronic device.

The side-key module may include a pressable button or a touch-sensitive control.

The side-key module may include a volume button or a power button.

The electronic device may further comprise a flexible printed circuit wrapped around at least a portion of the metal support to connect the side-key module to the main logic board.

The electronic device may further comprise a pressure sensitive adhesive connecting the flexible printed circuit to the metal support.

The flexible printed circuit may be routed along a first lengthwise portion of the interior surface of the metal frame, wrapped around one or more lateral sides of the metal support, and routed along a second lengthwise portion of the rear surface of the metal support.

The one or more fasteners may be electrically conductive and transfer the one or more antenna signals from the metal support to the metal frame.

The one or more fasteners may include at least two fasteners separated by the side-key module.

The electronic device may further comprise one or more gaskets positioned between the metal support and the metal frame.

The one or more gaskets may include two gaskets each positioned on an opposing side of the side-key module from one another to reduce signal interference from the antenna signal to the side-key module.

The two gaskets may be located between two of the at least two fasteners.

The one or more fasteners may include screws, bolts, rivets, or studs.

The electronic device may further comprise multiple antenna springs including the antenna spring, wherein each of the multiple antenna springs is configured to: be in direct electrical contact with the metal support; and inject corresponding antenna signals into the metal support to route the corresponding antenna signals through the one or more metal fasteners and to the metal frame to induce radiation that generates the one or more antennas.

CONCLUSION

Although aspects of the antenna system integrated with side-keys of an electronic device have been described in language specific to features and/or methods, the subject of the appended claims is not necessarily limited to the specific features or methods described. Rather, the specific features and methods are disclosed as example implementations of the claimed antenna system integrated with side-keys of an electronic device, and other equivalent features and methods are intended to be within the scope of the appended claims. Further, various different aspects are described, and it is to be appreciated that each described aspect can be implemented independently or in connection with one or more other described aspects.

What is claimed is:

1. An electronic device comprising:
   a housing;
   a main logic board disposed within the housing, the main logic board having a signal generator configured to generate, through one or more antennas, one or more antenna signals;
   a metal frame disposed along at least one edge of the housing and configured to provide structural support for the housing, the metal frame having:
      one or more apertures that enable the metal frame to be configured as an antenna radiating element of the one or more antenna signals generated by the one or more antennas; and
      an interior surface and an opposing, exterior surface;
   a side-key module embedded in the metal frame;
   a metal support having an elongated shape and oriented to be substantially parallel with the metal frame, the metal support having one or more contact surfaces that abut the interior surface of the metal frame on one or more opposing sides of the side-key module, at least a portion of the side-key module positioned directly between the metal support and the metal frame, the metal support having a rear surface that is opposite the one or more contact surfaces;
   an antenna spring in direct electrical contact with the metal support and the signal generator, the antenna spring configured to inject the one or more antenna signals into the metal support; and
   one or more metal fasteners affixing the metal support to the metal frame to provide a path for the one or more antenna signals to be routed from the metal support to the metal frame.

2. The electronic device of claim 1, wherein the side-key module is positioned between the antenna spring and the metal frame.

3. The electronic device of claim 1, wherein the side-key module includes a user input mechanism configured to control one or more functions of the electronic device or an application executing on the electronic device.

4. The electronic device of claim 3, wherein the user input mechanism is a pressable button or a touch-sensitive control.

5. The electronic device of claim 3, wherein the user input mechanism is a volume button or a power button.

6. The electronic device of claim 1, further comprising a flexible printed circuit wrapped around at least a portion of the metal support to connect the side-key module to the main logic board.

7. The electronic device of claim 6, further comprising a pressure sensitive adhesive connecting the flexible printed circuit to the metal support.

8. The electronic device of claim 6, wherein the flexible printed circuit is routed along a first lengthwise portion of the interior surface of the metal frame, wrapped around one or more lateral sides of the metal support, and routed along a second lengthwise portion of the rear surface of the metal support.

9. The electronic device of claim 1, wherein the one or more fasteners are electrically conductive and transfer the one or more antenna signals from the metal support to the metal frame.

10. The electronic device of claim 1, wherein the one or more fasteners include at least two fasteners separated by the side-key module.

11. The electronic device of claim 10, further comprising one or more gaskets positioned between the metal support and the metal frame.

12. The electronic device of claim 11, wherein the one or more gaskets include two gaskets each positioned on an opposing side of the side-key module from one another to reduce signal interference from the one or more antenna signals to the side-key module.

13. The electronic device of claim 12, wherein the two gaskets are located between two of the at least two fasteners.

14. The electronic device of claim 1, wherein the one or more fasteners include screws, bolts, rivets, or studs.

15. The electronic device of claim 1, further comprising multiple antenna springs including the antenna spring, wherein each of the multiple antenna springs is configured to:
   be in direct electrical contact with the metal support; and
   inject corresponding antenna signals into the metal support to route the corresponding antenna signals through the one or more metal fasteners and to the metal frame to induce radiation that generates the one or more antennas.

16. An antenna system of an electronic device, the antenna system comprising:
   a signal generator configured to generate, through one or more antennas, one or more antenna signals;
   a metal frame having one or more apertures that enable the metal frame to be configured as an antenna radiating element of the one or more antenna signals generated by one or more antennas, the metal frame having a side-key module embedded therein;
   a metal support having an elongated shape and oriented to be substantially parallel with the metal frame, the metal support having one or more contact surfaces that abut an interior surface of the metal frame on one or more opposing sides of the side-key module embedded in the metal frame, at least a portion of the side-key module positioned directly between the metal support and the metal frame, the metal support having a rear surface that is opposite the one or more contact surfaces;
   an antenna spring in direct electrical contact with the metal support and the signal generator, the antenna spring configured to inject the one or more antenna signals into the metal support; and
   one or more metal fasteners affixing the metal support to the metal frame to provide a path for the one or more antenna signals to be routed from the metal support to the metal frame.

17. The antenna system of claim 16, wherein the one or more fasteners are electrically conductive and transfer the one or more antenna signals from the metal support to the metal frame.

18. The antenna system of claim 16, wherein the one or more fasteners include at least two fasteners separated by the side-key module.

19. The antenna system of claim 16, wherein the one or more fasteners include screws, bolts, rivets, or studs.

20. The antenna system of claim 16, further comprising multiple antenna springs including the antenna spring, wherein each of the multiple antenna springs is configured to:
   be in direct electrical contact with the metal support; and
   inject corresponding antenna signals into the metal support to route the corresponding antenna signals through the one or more metal fasteners and to the metal frame to induce radiation that generates the one or more antennas.

* * * * *